United States Patent
Yun et al.

(10) Patent No.: US 12,317,254 B2
(45) Date of Patent: *May 27, 2025

(54) APPARATUS AND METHOD FOR TRANSMITTING UPLINK SIGNALS IN WIRELESS COMMUNICATION SYSTEM

(71) Applicant: Samsung Electronics Co., Ltd., Suwon-si (KR)

(72) Inventors: Yeohun Yun, Hwaseong-si (KR); Yongok Kim, Seoul (KR); Chanhong Kim, Suwon-si (KR); Jongbu Lim, Seoul (KR); Sungnam Hong, Suwon-si (KR); Taeyoung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 514 days.

This patent is subject to a terminal disclaimer.

(21) Appl. No.: 17/457,210

(22) Filed: Dec. 1, 2021

(65) Prior Publication Data

US 2022/0095336 A1    Mar. 24, 2022

Related U.S. Application Data

(63) Continuation of application No. 16/125,610, filed on Sep. 7, 2018, now Pat. No. 11,202,304.

(30) Foreign Application Priority Data

Sep. 8, 2017    (KR) .................. 10-2017-0115402

(51) Int. Cl.
*H04W 72/1268*    (2023.01)
*H04L 5/00*    (2006.01)
(Continued)

(52) U.S. Cl.
CPC ....... *H04W 72/1268* (2013.01); *H04L 5/0053* (2013.01); *H04W 72/23* (2023.01);
(Continued)

(58) Field of Classification Search
CPC ............. H04W 72/1268; H04W 72/23; H04W 74/0833; H04W 4/70; H04W 74/006;
(Continued)

(56) References Cited

U.S. PATENT DOCUMENTS

2001/0038619 A1    11/2001    Baker et al.
2008/0102753 A1    5/2008    Brunel et al.
(Continued)

FOREIGN PATENT DOCUMENTS

CN    1383626 A    12/2002
CN    101841401 A    9/2010
(Continued)

OTHER PUBLICATIONS

CMCC, 'Considerations on support of supplementary uplink frequency', R2-1 709093, 3GPP TSG-RAN WG2 Meeting #99, Berlin, Germany, Aug. 11, 2017 (Year: 2017).*
(Continued)

*Primary Examiner* — Khaled M Kassim
*Assistant Examiner* — Oladiran Gideon Olaleye

(57) ABSTRACT

A communication method and system for converging a fifth generation (5G) communication system for supporting higher data rates beyond a fourth generation (4G) system with a technology for internet of things (IoT) includes intelligent services based on the 5G communication technology and the IoT-related technology. A method by a terminal for transmitting uplink data in a wireless communication system comprises receiving downlink control information for scheduling of uplink transmission in a cell from a base station and transmitting the uplink data to the base (Continued)

station on the supplementary uplink if the indicator indicates the scheduling of the uplink transmission is associated with the supplementary uplink in the cell. The downlink control information includes an indicator indicating whether the scheduling of the uplink transmission is associated with a supplementary uplink in the cell.

20 Claims, 17 Drawing Sheets

(51) Int. Cl.
| | | |
|---|---|---|
| *H04L 5/14* | (2006.01) | |
| *H04W 4/70* | (2018.01) | |
| *H04W 72/23* | (2023.01) | |
| *H04W 74/00* | (2009.01) | |
| *H04W 74/0833* | (2024.01) | |
| *H04W 84/04* | (2009.01) | |

(52) U.S. Cl.
CPC ....... *H04W 74/0833* (2013.01); *H04L 5/1469* (2013.01); *H04W 4/70* (2018.02); *H04W 74/006* (2013.01); *H04W 84/042* (2013.01)

(58) Field of Classification Search
CPC ............. H04W 84/042; H04W 74/002; H04L 5/0053; H04L 5/1469; H04L 5/0094; H04L 5/001
USPC ......................................................... 370/329
See application file for complete search history.

(56) References Cited

U.S. PATENT DOCUMENTS

| | | | |
|---|---|---|---|
| 2008/0232278 A1 | 9/2008 | Brunel et al. | |
| 2009/0023016 A1 | 1/2009 | Tanahashi et al. | |
| 2010/0111023 A1 | 5/2010 | Pelletier et al. | |
| 2010/0130219 A1* | 5/2010 | Cave | H04W 8/26 455/450 |
| 2010/0246499 A1 | 9/2010 | Kim et al. | |
| 2013/0034073 A1 | 2/2013 | Aiba et al. | |
| 2013/0163543 A1* | 6/2013 | Freda | H04W 16/14 370/329 |
| 2013/0165134 A1* | 6/2013 | Touag | H04W 72/0486 455/452.1 |
| 2014/0307652 A1* | 10/2014 | Zhang | H04L 5/0053 370/329 |
| 2015/0181546 A1* | 6/2015 | Freda | H04W 76/14 370/336 |
| 2017/0150491 A1 | 5/2017 | Lin et al. | |
| 2018/0359784 A1 | 12/2018 | Agiwal et al. | |
| 2018/0376510 A1 | 12/2018 | Sun et al. | |
| 2019/0254008 A1 | 8/2019 | Medles et al. | |
| 2020/0169990 A1* | 5/2020 | Takeda | H04J 1/00 |

FOREIGN PATENT DOCUMENTS

| | | |
|---|---|---|
| CN | 103098536 A | 5/2013 |
| CN | 105519223 A | 4/2016 |
| EP | 2689622 A1 | 1/2014 |
| JP | 2009026353 A | 2/2009 |
| KR | 10-2015-0140834 A | 12/2015 |
| WO | 2013009109 A2 | 1/2013 |
| WO | 2013/103545 A1 | 7/2013 |
| WO | 2016062055 A1 | 4/2016 |
| WO | 2017/062849 A1 | 4/2017 |
| WO | 2018/226026 A1 | 12/2018 |

OTHER PUBLICATIONS

Notice of Allowance dated Jul. 25, 2023, in connection with Chinese Patent Application No. 201880057660.X, 8 pages.
ISA/KR, International Search Report for International Application No. PCT/KR2018/010495 dated Dec. 7, 2018, 3 pages.
CMCC, "Considerations on support of supplementary uplink frequency," R2-1709093, 3GPP TSG-RAN WG2 Meeting #99, Berlin, Germany, Aug. 21-25, 2017, 5 pages.
Mediatek Inc., "Support Initial Access on Supplementary Uplink," R2-1708050, 3GPP TSG-RAN WG2 Meeting #99, Berlin, Germany, Aug. 21-25, 2017, 4 pages.
Samsung, "On supporting the supplementary uplink frequency," R2-1708895, 3GPP TSG-RAN WG2 Meeting #99, Berlin, Germany, Aug. 21-25, 2017, 3 pages.
Huawei et al., "Initial access and uplink operations with SUL", 3GPP TSG RAN WG1 Meeting #90, Aug. 21-25, 2017, R1-1712165, 6 pages.
LG Electronics, "Remaining details on UL sharing between LTE and NR", 3GPP TSG RAN WG1 Meeting Ad-Hoc, Jun. 27-30, 2017, R1-1710354, 6 pages.
Supplementary European Search Report dated Jul. 17, 2020 in connection with European Patent Application No. 18 85 4584, 9 pages.
Korean Intellectual Property Office, "Decision of Patent" issued Jan. 5, 2022, in connection with Korean Patent Application No. 10-2017-0115402, 11 pages.
CMCC, "Way forward on the support of Supplementary Uplink in NR" 3GPP TSG RAN WG1, Meeting #89, R1- 1709587, Hangzhou, P.R. China, May 15-19, 2017, 2 pages.
CMCC, "System Information for supporting the supplementary uplink (SUL) frequency" 3GPP TSG-RAN WG2 NR AdHoc, R2-1707461,Qingdao, China, Jun. 27-29, 2017, 1 page.
China National Intellectual Property Administration (CNIPA), "The First Office Action," dated Feb. 28, 2023, in connection with counterpart Chinese Patent Application No. 201880057660.X, 26 pages.

* cited by examiner

APPARATUS AND METHOD FOR TRANSMITTING UPLINK SIGNALS IN WIRELESS COMMUNICATION SYSTEM

CROSS-REFERENCE TO RELATED APPLICATIONS

This application is a continuation of application Ser. No. 16/125,610, filed Sep. 7, 2018, which is based on and claims priority under 35 U.S.C. § 119(a) to Korean Patent Application No. 10-2017-0115402, filed Sep. 8, 2017, in the Korean Intellectual Property Office, the disclosures of which are incorporated herein by reference in their entirety.

BACKGROUND

1. Field

Various embodiments of the present disclosure relate to an apparatus and a method for transmitting and receiving data in a wireless communication system, and more particularly, to an apparatus and a method for transmitting and receiving data in a wireless communication system having a plurality of uplinks.

2. Description of the Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'beyond 4G network' or a 'post long term evolution (LTE) System'. The 5G wireless communication system is considered to be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive multiple-input multiple-output (MIMO), full dimensional MIMO (FD-MIMO), array antenna, an analog beam forming, and large scale antenna techniques are being considered in the design of the 5G wireless communication system. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internee of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

In a 5G communication system, a high frequency band and a low frequency band are all considered in terms of frequency, as the 5G communication system covers a wide range of frequency bands. However, in the high frequency band, the coverage thereof is reduced because, in the high frequency band, a propagation loss (path loss) is increased due to channel characteristics. The disadvantage is a kind of constraint that makes it difficult for existing LTE operators to place new radio (NR) base stations at the same locations as those of existing LTE base stations. One way to overcome the problem is to arrange additional uplinks in the low frequency band so as to ensure the coverage, since the coverage of the uplink is generally affected. In other words, an uplink and a downlink are arranged in the high frequency band using a time division duplex (TDD) and an uplink is additionally arranged in the low frequency band using a frequency division duplex (FDD). As described above, the arrangement of only the uplink without being paired with the downlink is referred to as a supplementary uplink (SUL). When the supplementary uplink is added in this way, an initial access procedure of a terminal considering the above, a method for transmitting and receiving data and control signals after the initial access, and the like should be supported.

SUMMARY

Accordingly, an object of the present disclosure is directed to provision of an efficient method and apparatus for an initial access procedure of a terminal in a system having a plurality of uplinks.

Another object of the present disclosure is directed to provision of an efficient transmission and reception method and apparatus after the initial access considering capability that a receiver or a terminal can provide.

In accordance with a first aspect of the disclosure, a method by a terminal for transmitting uplink data in a wireless communication system is provided. The method comprises receiving downlink control information for scheduling of uplink transmission in a cell from a base station and transmitting the uplink data to the base station on the supplementary uplink if the indicator indicates that the scheduling of the uplink transmission is associated with the supplementary uplink in the cell. The downlink control information includes an indicator indicating whether the scheduling of the uplink transmission is associated with a supplementary uplink in the cell.

In accordance with a second aspect of the disclosure, a method by a base station for receiving uplink data in a wireless communication system is provided. The base station comprises transmitting downlink control information for scheduling of uplink transmission in a cell to a terminal and receiving the uplink data from the terminal on the supplementary uplink. The downlink control information includes indicator indicating that the scheduling of the uplink transmission is associated with a supplementary uplink in the cell.

In accordance with a third aspect of the disclosure, a terminal for transmitting uplink data in a wireless communication system is provided. The terminal comprises a transceiver configured to receive signals from a base station and transmit signals to the base station, and a controller coupled with the transceiver. The controller is configured to control the transceiver to receive downlink control information for scheduling of uplink transmission in a cell from the base station and transmit the uplink data to the base station on the supplementary uplink if the indicator indicates that the scheduling of the uplink transmission is associated with the supplementary uplink in the cell. The downlink control information includes indicator indicating that the scheduling of the uplink transmission is associated with a supplementary uplink in the cell.

In accordance with a fourth aspect of the disclosure, a base station for receiving uplink data in a wireless communication system is provided. The base station comprises a transceiver configured to receive signals from a terminal and transmit signals to the terminal, and a controller coupled with the transceiver. The controller is configured to control to the transceiver to transmit downlink control information for scheduling uplink transmission in a cell to the terminal and receive the uplink data from the terminal on the supplementary uplink. The downlink control information includes indicator indicating that the scheduling of the uplink transmission is associated with a supplementary uplink in the cell.

According to one embodiment of the present disclosure, in the wireless communication system having a plurality of uplinks, an initial random access channel (RACH) access can be efficiently performed, and a successful access may be effectively achieved.

In addition, according to one embodiment of the present disclosure, in the wireless communication system having a plurality of uplinks, initial and subsequent RACH accesses can be efficiently performed for each uplink transmission capability of the terminal, and the effect of improving a transmission and reception efficiency can be achieved by linking indication information transmitted at a plurality of time points to perform the uplink transmission.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
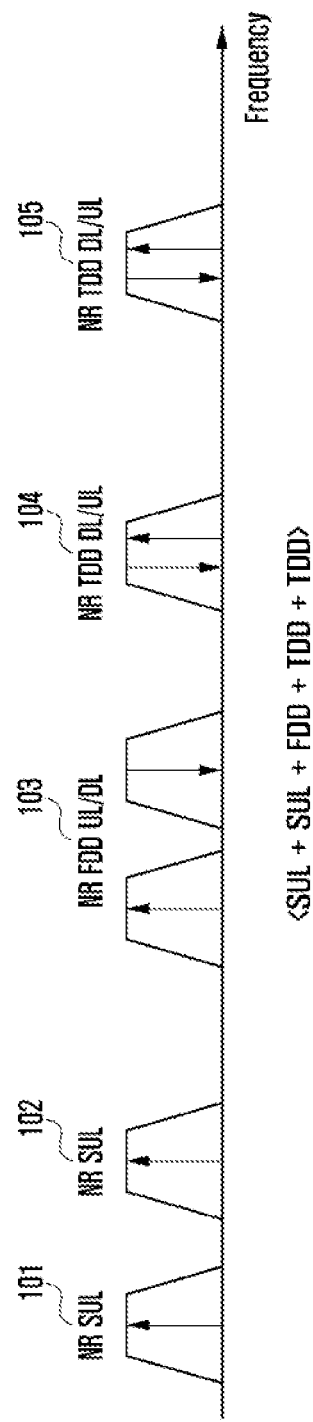
FIG. 1 is a diagram illustrating a case where component carriers include two supplementary uplinks, a frequency division duplex (FDD) uplink/downlink and two time division duplex (TDD) uplink/downlinks.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereafter, embodiments of the present disclosure will be described in detail with reference to the accompanying drawings. When it is decided that a detailed description for the known function or configuration related to the present disclosure may obscure the gist of the present disclosure, the detailed description therefor will be omitted. Further, the following terminologies are defined in consideration of the functions in the present disclosure and may be construed in different ways by the intention or practice of users and operators. Therefore, the definitions thereof should be construed based on the contents throughout the specification.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5GNB), or gNB.

The "UE" is an entity communicating with a BS and may be referred to as UE, device, mobile station (MS), mobile equipment (ME), or terminal.

First, it is assumed that a base station transmits and receives signals through a plurality of component carriers (CCs). Some of the plurality of component carriers are composed of a supplementary uplink having only an uplink and some are composed of uplink and downlink pairs.

FIG. 1 is a diagram illustrating a case where component carriers include two supplementary uplinks (101, 102), a frequency division duplex (FDD) uplink/downlink (103) and two time division duplex (TDD) uplink/downlinks (104, 105).

In an initial access, a terminal receives a synchronization signal block in one of the component carriers having the downlink and acquires a physical cell of the corresponding component carrier based on the received synchronization signal block. The terminal then receives remaining system information (RMSI), performs a random access channel (RACH) operation based on RACH configuration information in the supplementary uplinks received from the RMSI and the uplink paired with the downlink where the synchronization signal block is received, and terminates a radio resource control (RRC) connection procedure after Msg5.

The terminal may perform the RACH operation through one of the supplementary uplinks or one of the uplinks paired with the downlink where the synchronization signal block is received. That is, according to an embodiment of FIG. 1, the terminal may perform an initial random access operation using any one of the component carriers having three uplinks, i.e., two supplementary uplinks (101, 102) and one uplink (one of 103, 104, 105) paired with the downlink where the synchronization signal block is received. In the operation, the base station may assign an ID to the supplementary uplink having no downlink, and the following methods are available.

1) When transmitting the RACH configuration information on the supplementary uplinks in the RMSI, the ID corresponding to each supplementary uplink is also transmitted.

2) When the terminal transmits a random access preamble in a random access preamble message (hereinafter referred to as Msg1) based on the RACH configuration information on the supplementary uplinks included in the base station transmits the ID of the supplementary uplink where the random access is performed to the terminal in a random access preamble response message (hereinafter referred to as Msg2) or the RRC connection setup message (hereinafter referred to as Msg4).

Through the above operation, the base station and the terminal may assign the ID to the supplementary uplink. The supplementary uplink ID is an ID different from the physical cell ID. Therefore, the physical cell ID of the terminal that performs the random access in the supplementary uplink corresponds to the physical cell ID of the component carrier with which the terminal is synchronized irrespective of the supplementary uplink ID.

Figure 2:
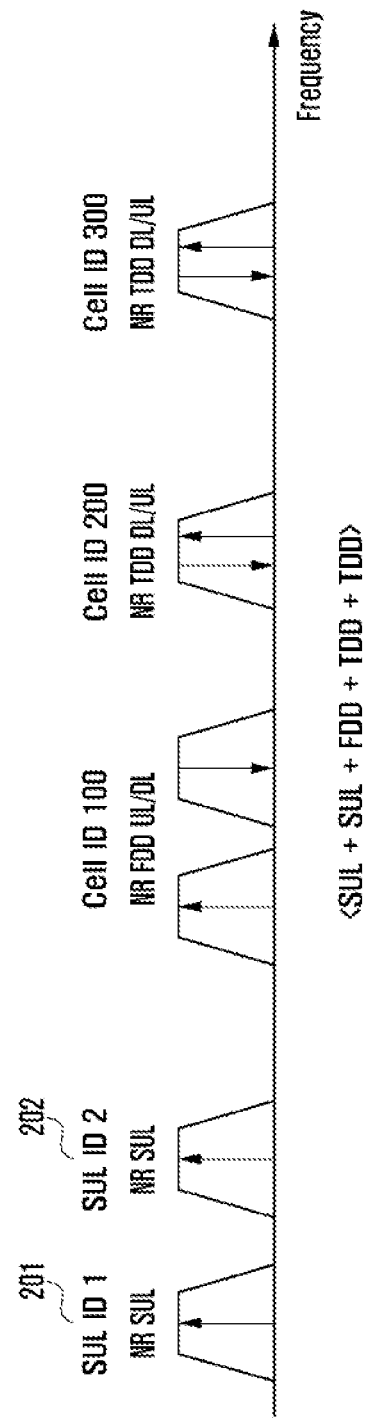
FIG. 2 is a diagram illustrating an example of assigning an ID of a supplementary uplink according to one embodiment of the present disclosure, where, when the ID of the supplementary uplink is transmitted in RMSI, the ID is assigned.

FIG. 2 is a diagram illustrating an example of assigning an ID of a supplementary uplink according to one embodiment of the present disclosure, where, when the ID of the supplementary uplink is transmitted in RMSI, the ID is assigned.

The base station may transmit the ID of the supplementary uplink included in the RMSI. In this case, the base station may inform the terminal of all the IDs of the supplementary uplinks available to the base station. Therefore, referring to FIG. 2, a SUL ID 1 and a SUL ID 2 may be assigned to two supplementary uplinks (201, 202), respectively, which may be IDs different from physical cell identifiers.

Meanwhile, as described above, the ID of the supplementary uplink may be transmitted to the terminal in the Msg2 or the Msg4, and detailed description thereof will be described below.

Figure 3:
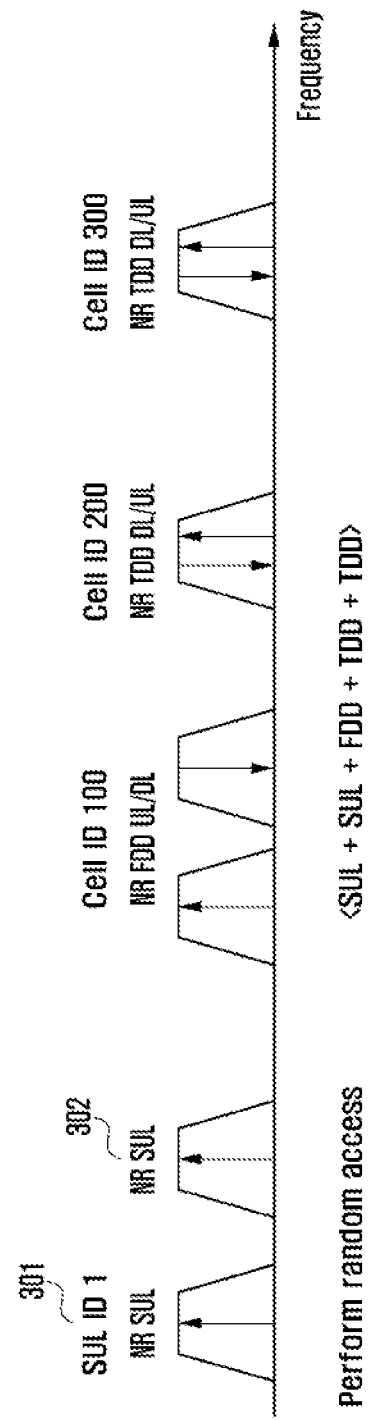
FIG. 3 is a diagram illustrating a method of assigning IDs to supplementary uplinks in which a terminal performs the random access using a Msg2 or a Msg4, according to one embodiment of the present disclosure.

FIG. 3 is a diagram illustrating a method of assigning IDs to supplementary uplinks in which a terminal performs the random access using a Msg2 or a Msg4, according to one embodiment of the present disclosure.

Referring to FIG. 3, a base station may assign a SUL ID 1 to the supplementary uplink in which the terminal performs the random access. In this case, the base station may assign the ID of the supplementary uplink (301) using the Msg2 or the Msg4, and may not assign the ID to the supplementary uplink (302) in which the random access is not performed.

Meanwhile, the terminal enters an 'RRC-connected' state after the initial random access operation. Then, when the base station schedules supplementary uplink resources through a downlink primary component carrier, it is possible to indicate which supplementary uplink among the plurality of supplementary uplinks is scheduled using the ID of the supplementary uplink.

The ID of the supplementary uplink may be informed based on a supplementary uplink component carrier indication field (SUL-CIF) and included in downlink control information (DCI) for scheduling uplink resources.

In one embodiment of the present disclosure, when there is one supplementary uplink for a terminal, a value '1' of SUL-CIF may indicate scheduling to the supplementary uplink, and a value '0' of SUL-CIF may indicate scheduling to the uplink paired with the downlink of the primary component carrier.

Figure 4:
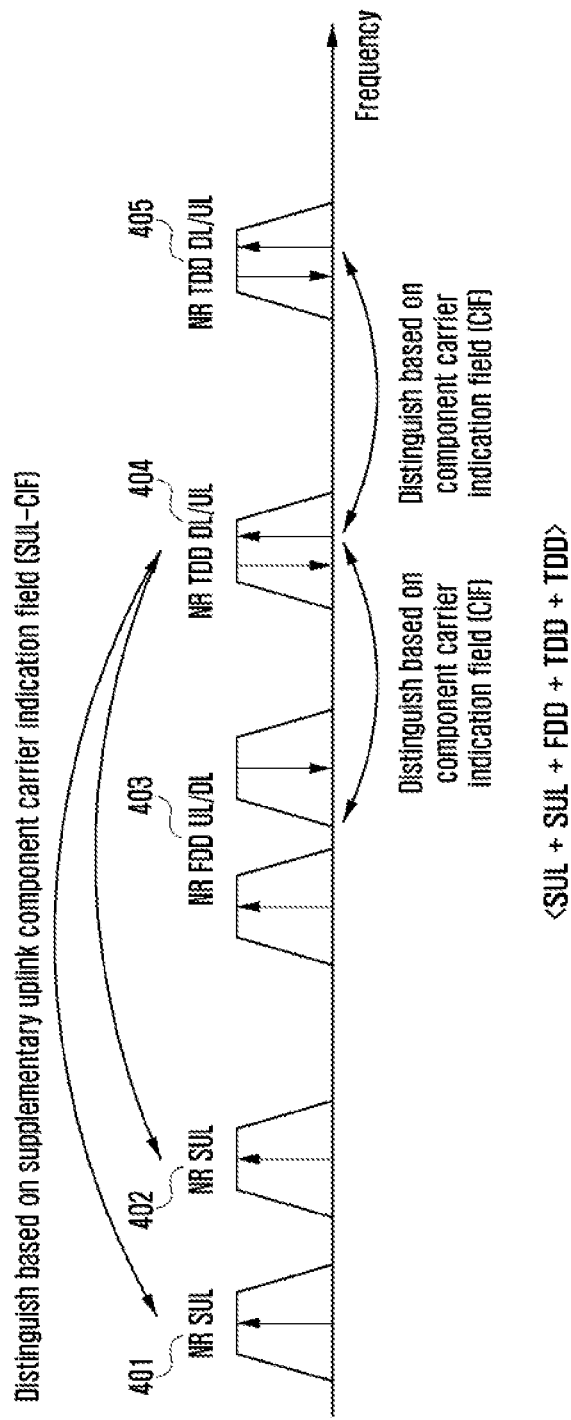
FIG. 4 is a diagram illustrating an example of a method for distinguishing the supplementary uplink component carrier from the component carrier, according to one embodiment of the present disclosure.

FIG. 4 is a diagram illustrating an example of a method for distinguishing the supplementary uplink component carrier from the component carrier, according to one embodiment of the present disclosure.

Referring to FIG. 4, there are SUL (401), SUL (402), NR FDD (403), NR TDD1 (404) and NR TDD2 (405). When scheduling uplink resources using a downlink control channel in NR TDD1 (404), NR FDD (403) and NR TDD2 (405) may be distinguished from each other based on a component carrier indication field (CIF), and two supplementary uplinks (401, 402) may be distinguished from each other based on the SUL-CIF.

Figure 5:
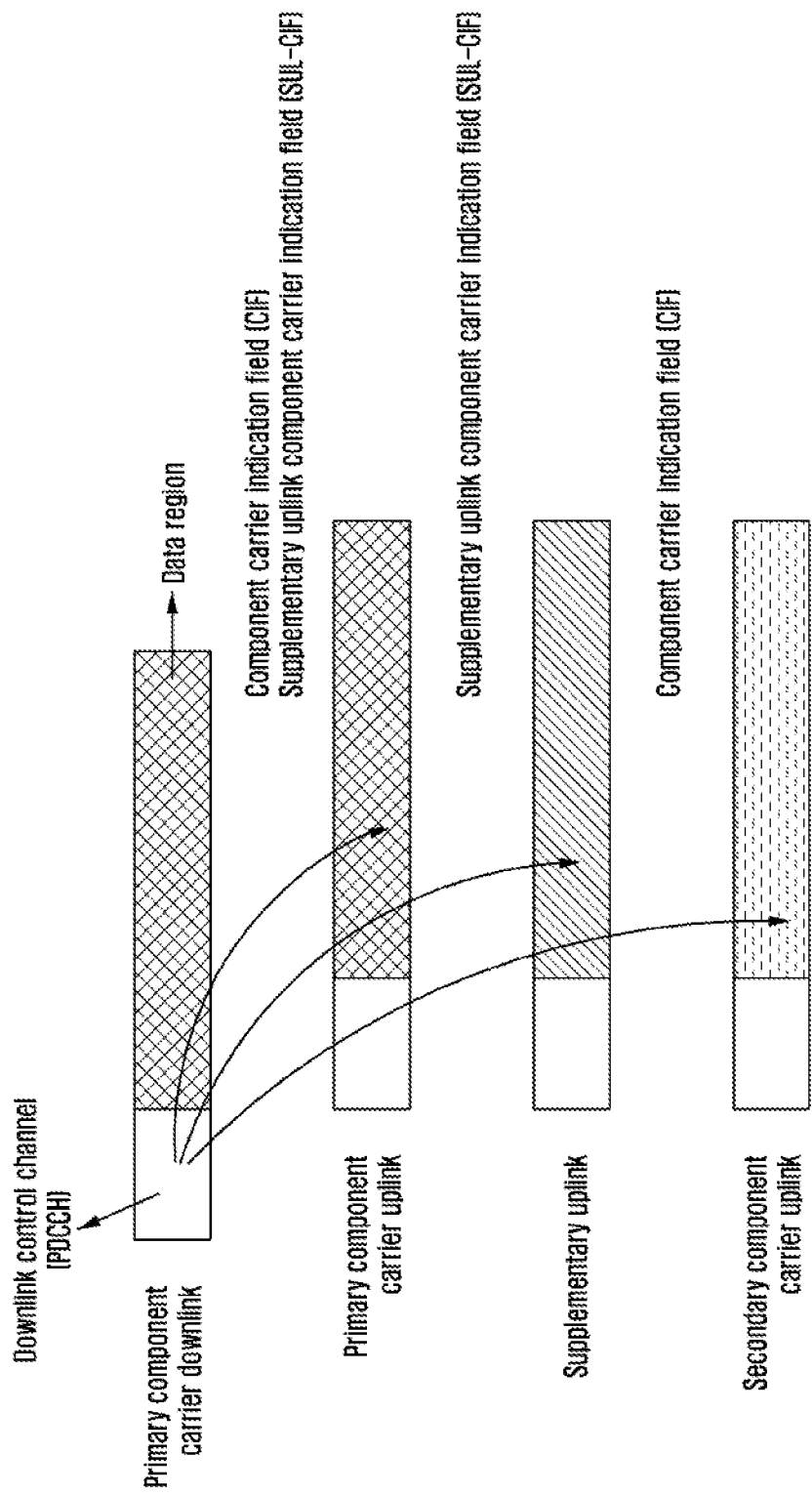
FIG. 5 is a diagram illustrating an example of a supplementary uplink component carrier indication field and a component carrier indication field, according to one embodiment of the present disclosure.

FIG. 5 is a diagram illustrating an example of a supplementary uplink component carrier indication field and a component carder indication field, according to one embodiment of the present disclosure.

The example of FIG. 5 shows a case where a terminal to which a base station is to schedule uplink resources has one supplementary uplink and one secondary component carrier uplink. Since the terminal has only one supplementary uplink, the base station may transmit the supplementary uplink component carrier indication on whether or not to be scheduled for the supplementary uplink in 1 bit. In addition, since the terminal has also only one secondary component carrier, the base station may also transmit the component carrier indication in 1 bit. For example, the base station may configure a value '0' of CIF and a value '0' of SUL-CIF to indicate that downlink control information transmitted on a downlink control channel in a primary component carrier downlink is for scheduling a primary component carrier uplink. The base station may configure a value '1' of SUL-CIF to indicate that downlink control information transmitted on a downlink control channel in a primary component carrier downlink is for scheduling the supplementary uplink. The base station may configure a value '1' of CIF to indicate downlink control information transmitted on a downlink control channel in a primary component carrier downlink is for scheduling a secondary component carder uplink. If the supplementary uplink is not configured for the terminal in a cell, SUL-CIF may be not configured, i.e., zero (0) bit of SUL-CIF may be configured. Alternatively, the base station may pre-configure the length of the supplementary uplink component carrier indication field to N bits, and in this case, the base station may transmit the corresponding information by 1 bit of the N bits. The base station may also pre-configure the length of the component carrier indication field to M bits, and in this case, the base station may transmit the corresponding information in 1 bit of the M bits.

Figure 6:
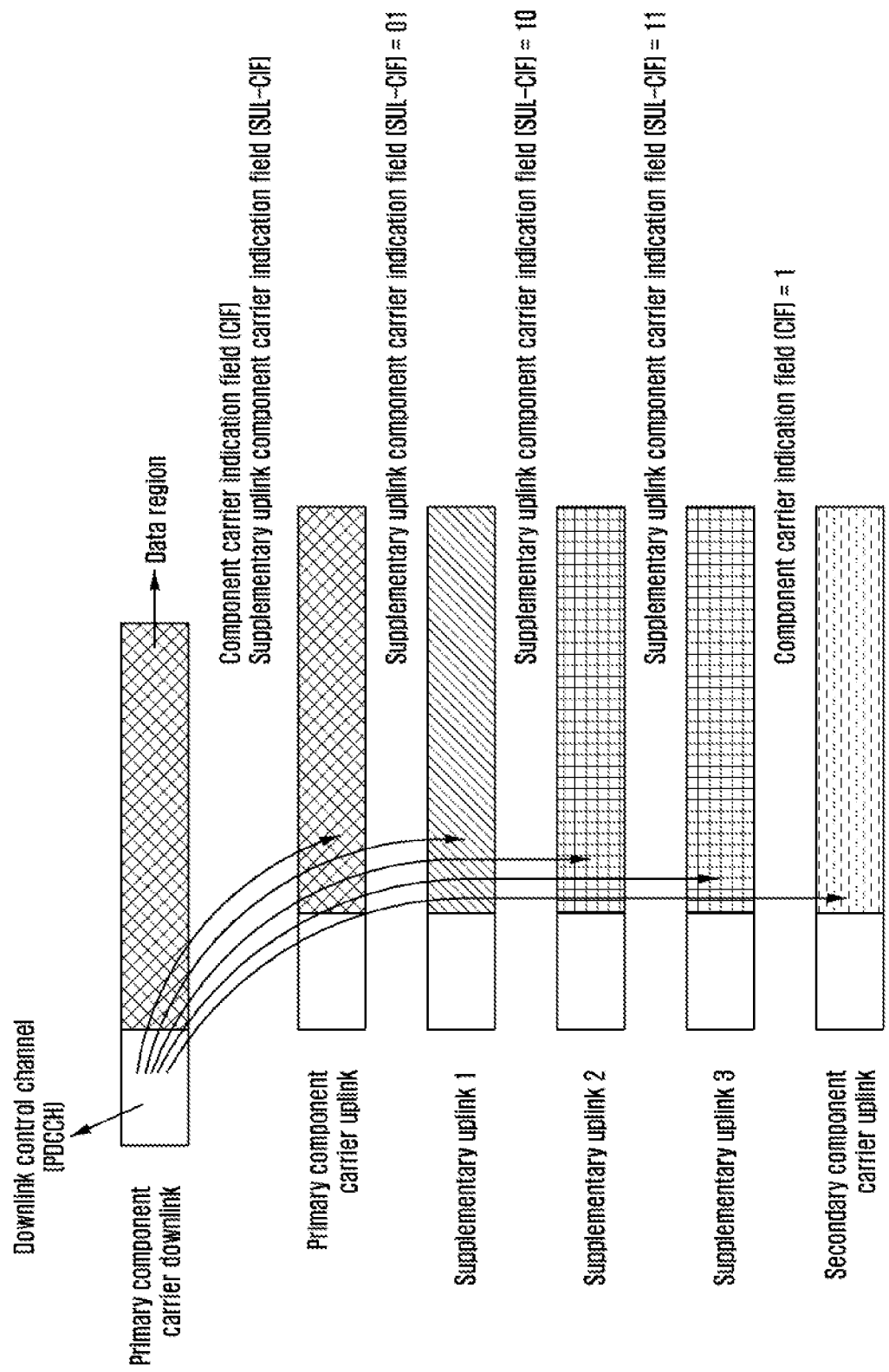
FIG. 6 is a diagram illustrating an example of the supplementary uplink component carrier indication field and the component carrier indication field when there are the plurality of supplementary uplinks, according to one embodiment of the present disclosure.

FIG. 6 is a diagram illustrating an example of the supplementary uplink component carrier indication field and the component carrier indication field when there are the plurality of supplementary uplinks, according to one embodiment of the present disclosure. The example of FIG. 6 shows a case where a terminal to which a base station is to schedule uplink resources has three supplementary uplinks and one secondary component carrier uplink. Since three supplementary uplinks exist, the base station may use 2 bits of SUL-CIF to indicate which supplementary uplink downlink among three supplementary uplinks is scheduled in downlink control information transmitted on a downlink control channel transmitted in a primary component carrier downlink.

Next, a case where the supplementary uplink has an independent physical cell ID is considered. The base station may also transmit the physical cell ID corresponding to each supplementary uplink when transmitting the RACH configuration information on the supplementary uplinks in the RMSI. In one embodiment of the present disclosure, when the supplementary uplink is the long term evolution (LTE) band, the physical cell ID used in the corresponding band of LTE may be also used in the supplementary uplink of the new radio (NR). In contrast, a value different from that of the LTE may be used.

Figure 7:
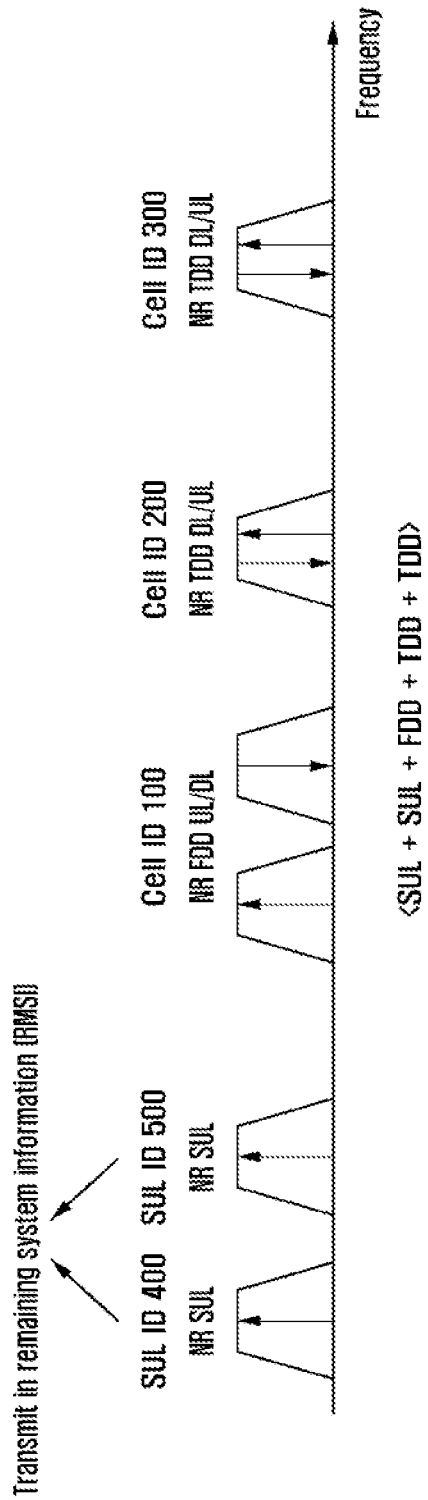
FIG. 7 is a diagram illustrating an example of transmitting the physical cell ID of the supplementary uplinks in the remaining system information (RMSI), according to one embodiment of the present disclosure.

FIG. 7 is a diagram illustrating an example of transmitting the physical cell ID of the supplementary uplinks in the remaining system information (RMSI), according to one embodiment of the present disclosure.

Here, the physical cell ID of the supplementary uplinks may be transmitted in the process of the terminal performing the random access operation using the supplementary uplink. When the terminal performs the random access, the base station may transmit the physical cell ID of the supplementary uplink to the terminal in the Msg2 or the Msg4.

Referring to FIG. 7, the physical cell ID (e.g., 400, 500) of the supplementary uplinks (701, 702) in the present disclosure may be transmitted in the Msg2 or the Msg4 during the random access process.

Next, when the physical cell ID is assigned to the supplementary uplink as described above, the following methods are available for configuring a primary component carrier (PCC) and a secondary component carrier (SCC) of the uplink.

1) Method 1: The supplementary uplink operates as the secondary component carrier, and the uplink paired with the downlink carrier where the synchronization signal block is received operates as the primary component carrier.

In this case, even though the terminal performs the random access process using the supplementary uplink and the RRC connection is completed in the supplementary uplink, the supplementary uplink operates as the secondary component carrier.

2) Method 2: The uplink where the terminal performs the random access process is set as the primary component carrier.

In this case, the base station is aware of the location of the primary component carrier of the terminal based on the location of the random access Msg1 from the terminal. When the terminal performs the random access using the supplementary uplink, the supplementary uplink becomes an uplink primary component carrier, and when the terminal performs the random access process using the uplink paired with the downlink where the synchronization signal block is received is performed, the paired uplink becomes the uplink primary component carrier. Detailed descriptions thereof will be described in FIG. 8.

Figure 8:
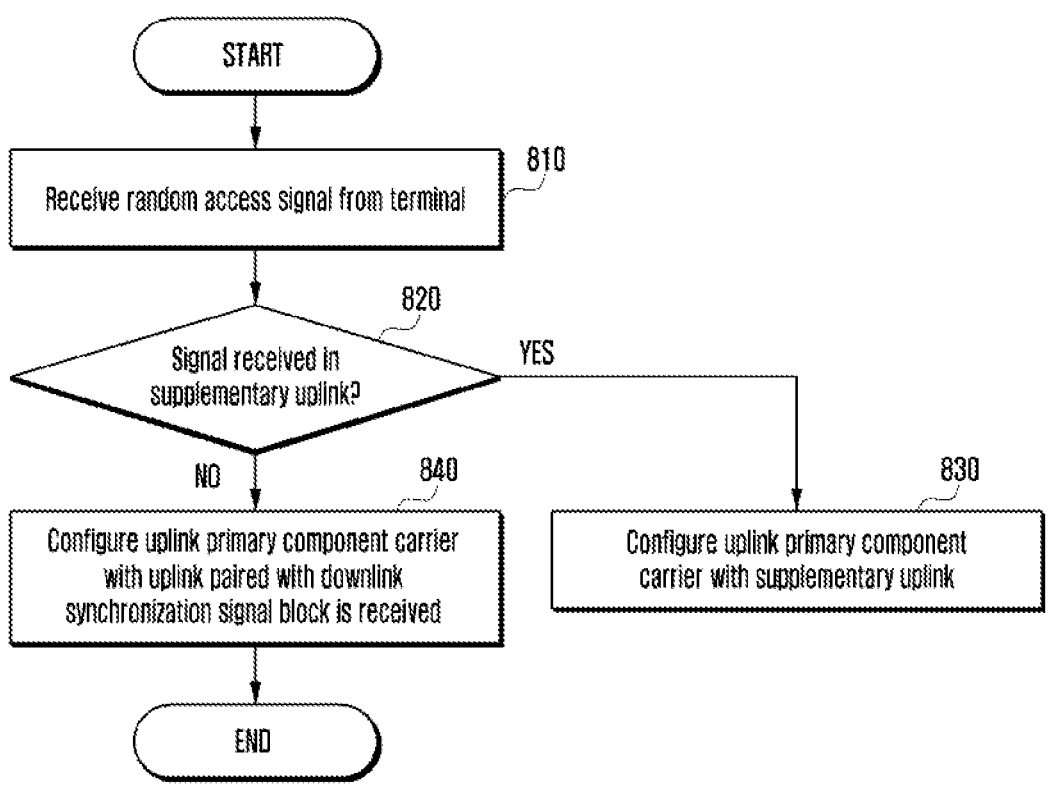
FIG. 8 is a flowchart illustrating a method by a base station for configuring the uplink primary component carrier, according to one embodiment of present disclosure.

FIG. 8 is a flowchart illustrating a method by a base station for configuring the uplink primary component carrier, according to one embodiment of present disclosure.

Referring to FIG. 8, the base station may receive the random access signal (or random access preamble) from the terminal at operation 810. Then, the base station may check whether or not the received random access signal is received in the supplementary uplink at operation 820.

As the check result, if the random access signal is received in the supplementary uplink, the base station may configure the primary component carrier with the supplementary uplink at operation 830. On the contrary, if the random access signal is not received in the supplementary uplink, the base station may configure the primary component carrier with the uplink paired with the downlink where the synchronization signal block is received at operation 840.

3) Method 3: The terminal receives information on the presence of the supplementary uplink in the RMSI, and when the terminal may perform the random access using the supplementary uplink, the terminal may inform the base station of the location of the uplink primary component carrier using one of the Msg1, the Msg3, and the Msg5 in the random access. The Msg3 may refer to an RRC connection request message, and the Msg5 may refer to an RRC connection setup complete message.

In this case, even though the terminal performs the random access using the uplink paired with the downlink where the synchronization signal block is received, the supplementary uplink may be configured as the primary component carrier, and the base station may be informed. On the contrary, even though the random access is performed using the supplementary uplink, the uplink paired with the downlink where the synchronization signal block is received may be configured as the primary component carrier, and the base station may be informed. The base station may go through the process of approving the location of the primary component carrier received from the terminal or may accept the location informed by the terminal as it is. Detailed descriptions thereof will be described in FIG. 9.

Figure 9:
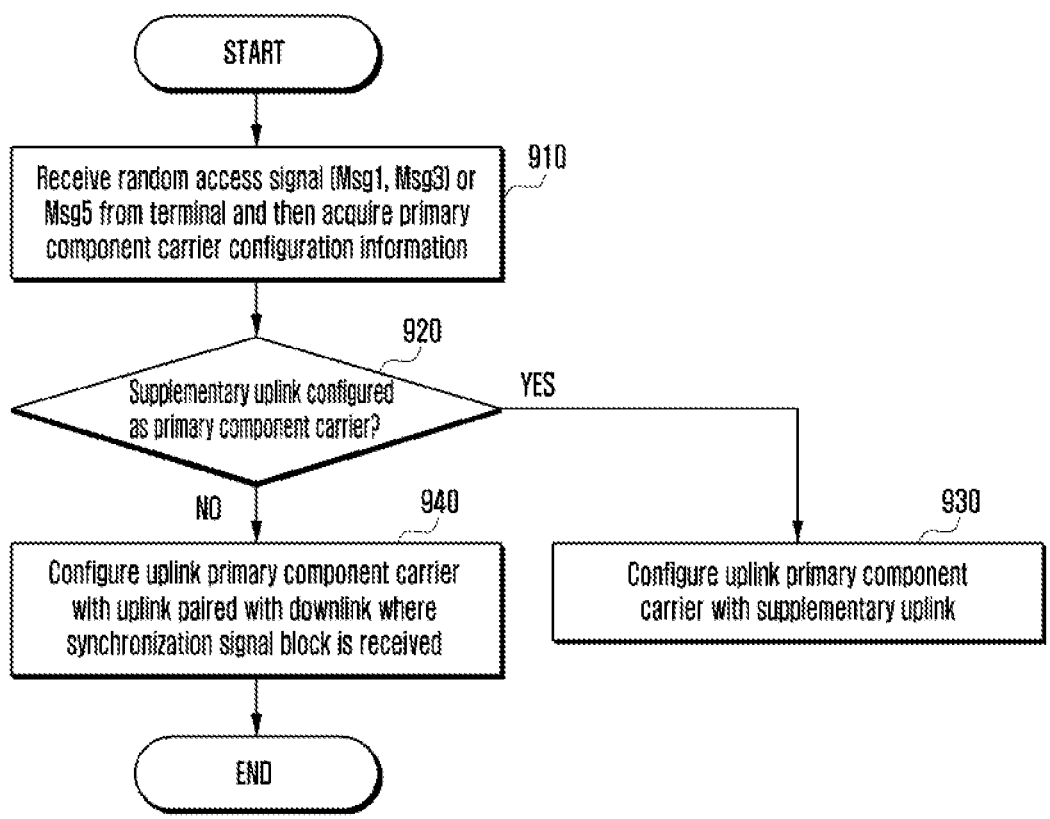
FIG. 9 is a flowchart illustrating a method by a base station for configuring the uplink primary component carrier, according to one embodiment of present disclosure.

FIG. 9 is a flowchart illustrating a method by a base station for configuring the uplink primary component carrier, according to one embodiment of present disclosure.

Referring to FIG. 9, the base station may receive the Msg1, the Msg3 or the Msg5 from the terminal, and then receive the primary component carrier configuration information at operation 910.

Then, the base station may determine whether the supplementary uplink is configured as the primary component carrier at operation 920. If the supplementary uplink is configured as the uplink primary component carrier, the base station may configure the primary component carrier with the supplementary uplink at operation 930. On the contrary, if the supplementary uplink is not configured as the primary component carrier, the base station may configure the primary component carrier with the uplink paired with the downlink where the synchronization signal block is received at operation 940.

If the base station goes through the process of approving the location of the primary component carrier, the following methods are available.

3-1) Method 3-1: If the terminal informs the base station of primary component carrier configuration information using the Msg1, the base station may approve the location of the uplink primary component carrier, or may indicate another location of the uplink primary component carrier using the Msg2 (or Msg4).

Figure 10:
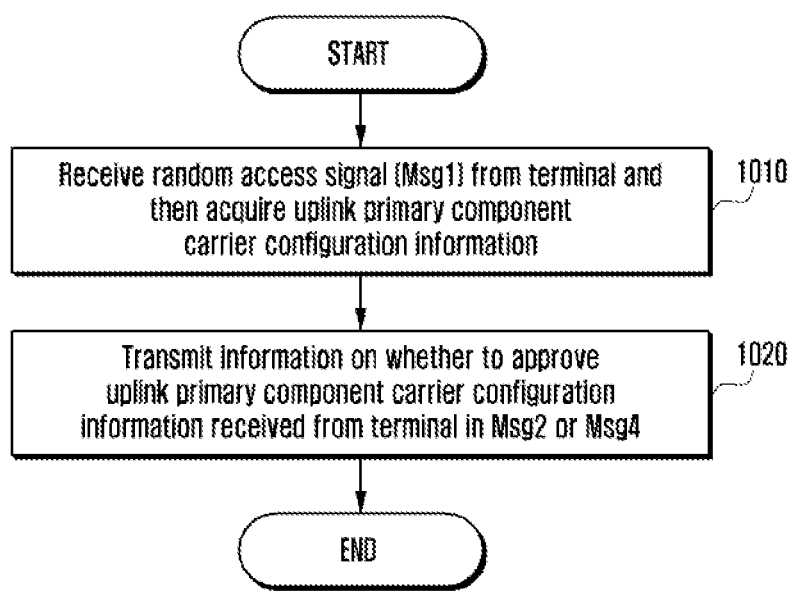
FIG. 10 is a flowchart illustrating a method by a base station for configuring the uplink primary component carrier, according to one embodiment of present disclosure.

FIG. 10 is a flowchart illustrating a method by a base station for configuring the uplink primary component carrier, according to one embodiment of present disclosure.

Referring to FIG. 10, the base station may receive the Msg1 from the terminal and acquire uplink primary component carrier configuration information at operation 1010.

Then, the base station may determine whether to approve the configuration information of the uplink primary component carrier received from the terminal, and may transmit the information related to the approval or disapproval to the terminal at operation 1020. In this case, the base station may transmit the information related to the approval or disapproval to the terminal in the Msg2 or the Msg4.

3-2) Method 3-2: If the terminal informs the base station of the primary component carrier configuration information using the Msg3, the base station may approve the location of the uplink primary component carrier or indicate another location of the uplink primary component carrier using the Msg4.

Figure 11:
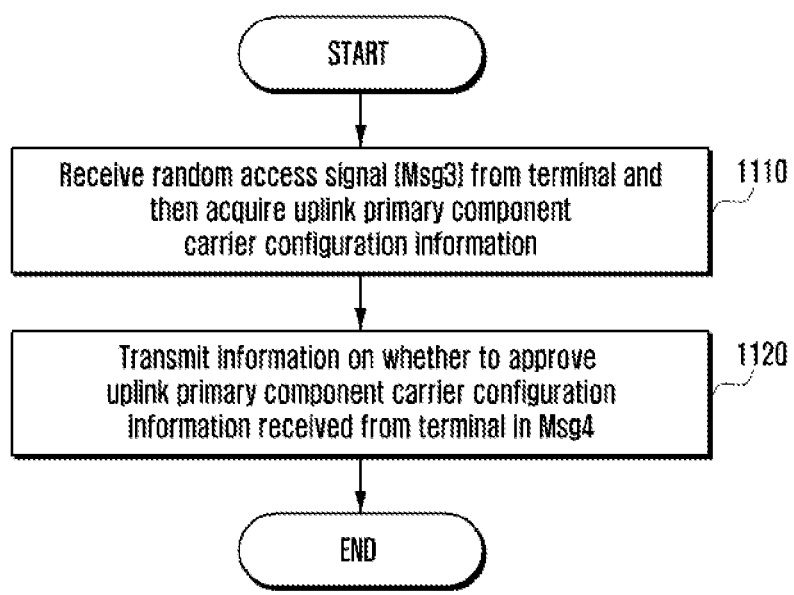
FIG. 11 is a flowchart illustrating a method by a base station for configuring the uplink primary component carrier, according to one embodiment of present disclosure.

FIG. 11 is a flowchart illustrating a method by a base station for configuring the uplink primary component carrier, according to one embodiment of present disclosure.

Referring to FIG. 11, the base station may receive the Msg1 from the terminal and acquire the uplink primary component carrier configuration information at operation 1110.

Then, the base station may determine whether or not to approve the configuration information of the uplink primary component carrier received from the terminal, and may transmit the information related to the approval or disapproval to the terminal at operation 1120. In this case, the base station may transmit the information related to the approval or disapproval to the terminal in the Msg4.

4) Method 4: The base station may acquire the supplementary uplink capability of the terminal based on the random access Msg1, Msg3, or Msg5 from the terminal, and may determine the uplink primary component carrier to inform the terminal of the determined result.

In this case, if the terminal transmits the random access Msg1 in the supplementary uplink, the terminal may not explicitly inform the base station of the supplementary uplink capability that the terminal has. However, if the terminal transmits the random access Msg1 to the uplink paired with the downlink where the synchronization signal block is received, the terminal explicitly informs the base station of the supplementary uplink capability using the Msg1, the Msg3, or the Msg5. If the base station acquires the supplementary uplink capability of the terminal based on the Msg1, the base station may determine the uplink primary component carrier and inform the terminal of the determined result using the Msg2 (or Msg4).

Figure 12:
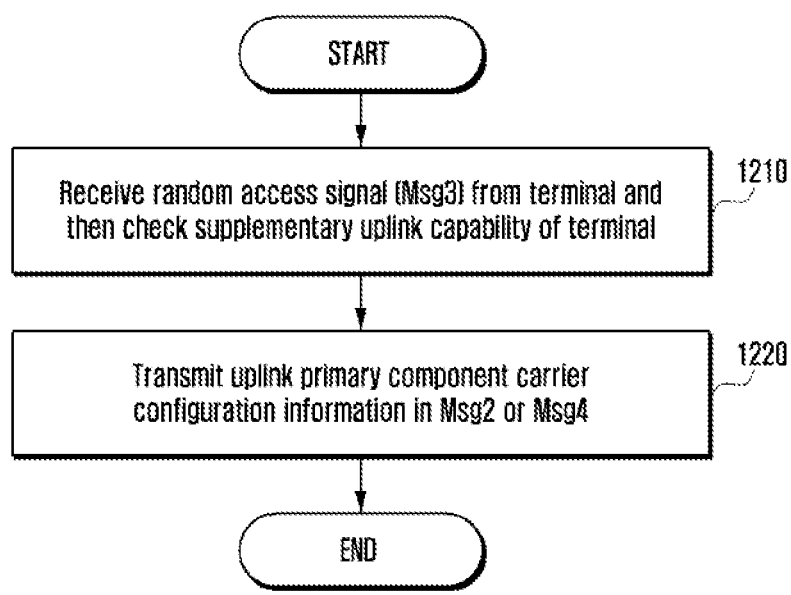
FIG. 12 is a flowchart illustrating a method by a base station for configuring the uplink primary component carrier, according to one embodiment of present disclosure.

FIG. 12 is a flowchart illustrating a method by a base station for configuring the uplink primary component carrier, according to one embodiment of present disclosure.

Referring to FIG. 12, the base station may receive the Msg1 including the random access preamble from the terminal at operation 1210. In this case, the Msg1 may include information on the supplementary uplink capability of the terminal, and the base station may check the supplementary uplink capability of the terminal.

Therefore, the base station may transmit the uplink primary component carrier configuration information to the terminal in the Msg2 or the Msg4 based on the supplementary uplink capability of the terminal at operation 1220.

Here, the base station may acquire the supplementary uplink capability of the terminal based on the Msg3. In such a case, the base station may determine the uplink primary component carrier and inform the terminal of the determined result using the Msg4.

Figure 13:
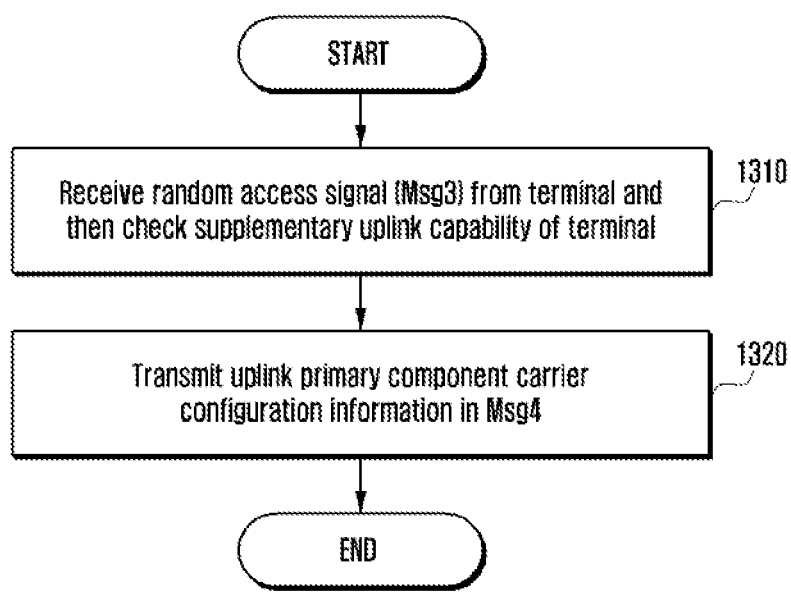
FIG. 13 is a flowchart illustrating a method by a base station for configuring the uplink primary component carrier, according to one embodiment of present disclosure.

FIG. 13 is a flowchart illustrating a method by a base station for configuring the uplink primary component carrier, according to one embodiment of present disclosure.

Referring to FIG. 13, the base station may receive the Msg3 from the terminal and may check the supplementary uplink capability of the terminal at operation 1310.

Then, the base station may transmit the uplink primary component carrier configuration information to the terminal in the Msg4 based on the supplementary uplink capability of the terminal at operation 1320.

Figure 14:
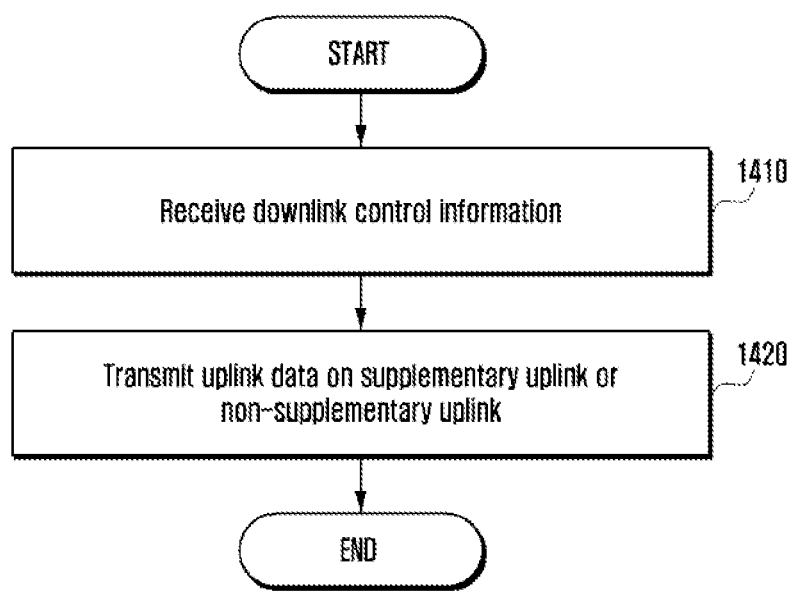
FIG. 14 is a flowchart illustrating a method by a terminal for transmitting uplink data in a wireless communication system according to an embodiment of the disclosure.

FIG. 14 is a flowchart illustrating a method by a terminal for transmitting uplink data in a wireless communication system according to an embodiment of the disclosure.

Referring to FIG. 14, the terminal receives downlink control information for scheduling of uplink transmission in a cell from a base station at operation 1410. As described above, the downlink control information may include an indicator indicating whether the scheduling of the uplink transmission is associated with a supplementary uplink in the cell. The indicator may be transmitted in 1 bit to indicate whether or not to be scheduled for the supplementary uplink. If the supplementary uplink is not configured for the terminal in a cell, the indicator may be not configured, i.e., the indicator may be configured with zero (0) bit.

The terminal determines whether to transmit the uplink data on the supplementary uplink or a non-supplementary uplink (e.g., a primary component carrier uplink, a secondary component carrier uplink) based on the indicator, and transmits the uplink data on the supplementary uplink or the non-supplementary uplink based on the determination at operation 1420. Specifically, if the indicator indicates that the scheduling of the uplink transmission is associated with the supplementary uplink, the terminal determines to transmit the uplink data on the supplementary uplink. Or, if the indicator indicates that the scheduling of the uplink transmission is associated with the non-supplementary uplink, the terminal determines to transmit the uplink data on the non-supplementary uplink.

Figure 15:
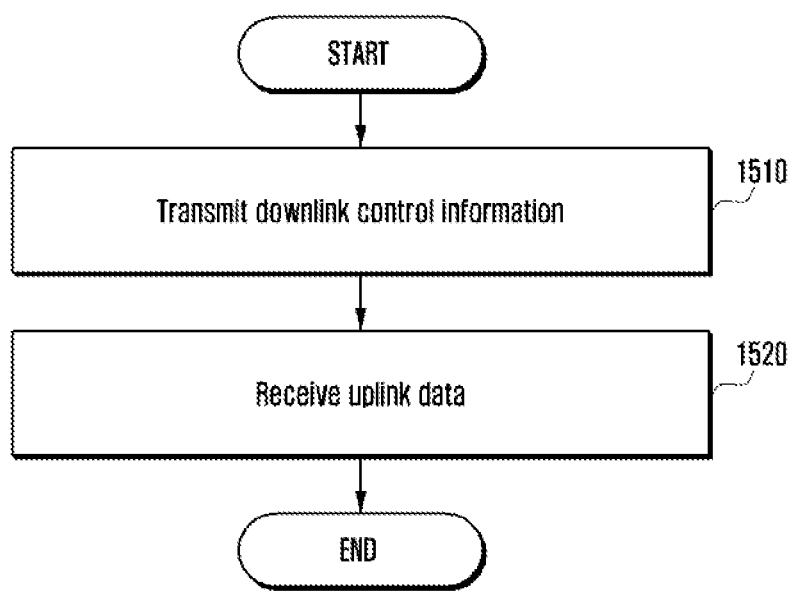
FIG. 15 is a flowchart illustrating a method by a base station for receiving uplink data in a wireless communication system according to an embodiment of the disclosure.

FIG. 15 is a flowchart illustrating a method by a base station for receiving uplink data in a wireless communication system according to an embodiment of the disclosure.

Referring to FIG. 15, the base station transmits downlink control information for scheduling of uplink transmission in a cell to a terminal at operation 1510. As described above, the base station may configure and transmit an indicator in the downlink control information to indicate whether the scheduling of the uplink transmission is associated with a supplementary uplink in the cell.

The base station receives the uplink data at operation 1520. If the base station transmits the downlink control information including the indicator indicating that the scheduling of the uplink transmission is associated with the supplementary uplink, the uplink data is received on the supplementary uplink. If the base station transmits the downlink control information including the indicator indicating that the scheduling of the uplink transmission is associated with a non-supplementary uplink in the cell, the uplink data is received on the non-supplementary uplink.

Figure 16:
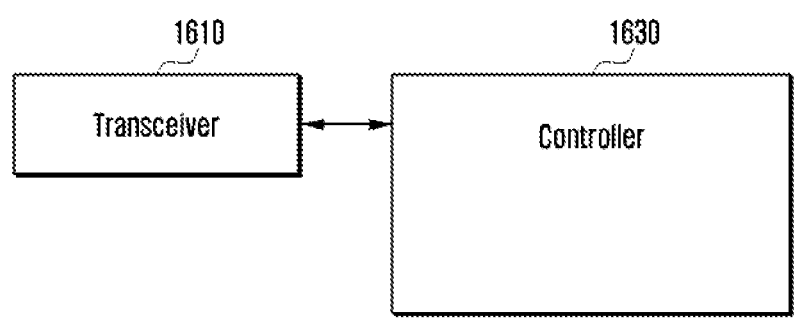
FIG. 16 is a block diagram of a terminal according to an embodiment of the disclosure.

FIG. 16 is a block diagram of a terminal according to an embodiment of the disclosure.

Referring to FIG. 16, the terminal includes a transceiver 1610 and a controller 1630. The transceiver 1610 and the controller 1630 are configured to perform the above described operations of the terminal. Although the transceiver 1610 and the controller 1630 are shown as separate entities, they may be realized as a single entity like a single chip. The transceiver 1610 and the controller 1630 may be electrically connected to or coupled with each other.

The transceiver 1610 may transmit and receive signals to and from other network entities, e.g., a base station.

The controller 1630 may control the terminal to perform a function according to one of the embodiments described above. For example, the controller 1630 may be configured to control the transceiver 1610 to receive downlink control information for scheduling of uplink transmission in a cell from a terminal, to determine whether to transmit the uplink data on the supplementary uplink or a non-supplementary uplink based on the indicator, and to control the transceiver 1610 to transmit the uplink data on the supplementary uplink or the non-supplementary uplink based on the determination. In addition, the controller 1630 may be configured to control the transceiver 1610 to receive RACH configuration information for the supplementary uplink from the base station in system information, to determine whether to perform a RA procedure on the supplementary uplink, and to control the transceiver 1610 to transmit a RA preamble to the base station on the supplementary uplink if the RA procedure is determined to be performed on the supplementary uplink. The controller 1630 may refer to a circuitry, an ASIC, or at least one processor.

Figure 17:
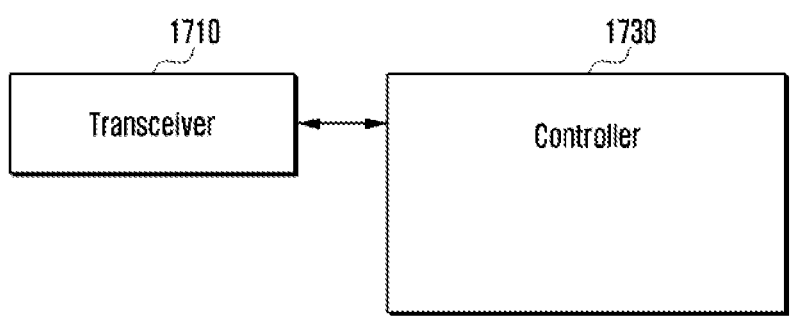
FIG. 17 is a block diagram of a base station according to an embodiment of the disclosure.

FIG. 17 is a block diagram of a base station according to an embodiment of the disclosure.

Referring to FIG. 17, a base station includes a transceiver 1710 and a controller 1730. The transceiver 1710 and the controller 1730 are configured to perform the above described operations of the network (e.g., gNB). Although the transceiver 1710 and the controller 1730 are shown as separate entities, they may be realized as a single entity like a single chip. The transceiver 1710 and the controller 1730 may be electrically connected to or coupled with each other.

The transceiver 1710 may transmit and receive signals to and from other network entities, e.g., a terminal.

The controller 1730 may control the base station to perform a function according to one of the embodiments described above. For example, the controller 1730 may be configured to control the transceiver 1710 to transmit downlink control information for scheduling of uplink transmission in a cell to the terminal and receive the uplink data from the terminal on a supplementary uplink or a non-supplementary uplink in the cell. If the base station transmits the downlink control information including an indicator indicating that the scheduling of the uplink transmission is associated with the supplementary uplink, the uplink data is received on the supplementary uplink. If the base station transmits the downlink control information including an indicator indicating that the scheduling of the uplink transmission is associated with the non-supplementary uplink, the uplink data is received on the non-supplementary uplink. In addition, the controller 1730 may be configured to control the transceiver 1710 to transmit RACH configuration information for the supplementary uplink to terminal in system information and receive a RA preamble from the terminal on the supplementary uplink if the RA procedure is determined to be performed on the supplementary uplink. The controller 1730 may refer to a circuitry, an ASIC, or at least one processor.

Meanwhile, the embodiments of the present disclosure disclosed in the present specification and the accompanying drawings have been provided only as specific examples in order to assist in understanding the present disclosure and do not limit the scope of the present disclosure. Therefore, it is to be understood that in addition to the various embodiments of the present disclosure described herein, all the changed or modified forms derived from the technical spirit of the present disclosure are included in the scope of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station, random access channel (RACH) configuration information for a supplementary uplink in system information;
   determining whether to perform a random access (RA) procedure on the supplementary uplink based on the RACH configuration information;
   transmitting, to the base station, an RA preamble on the supplementary uplink in case that the RA procedure is determined to be performed on the supplementary uplink;
   receiving, from a base station, downlink control information for scheduling of uplink transmission in a cell, wherein the downlink control information includes an indicator indicating a non-supplementary uplink in the cell or the supplementary uplink in the cell; and
   transmitting, to the base station, uplink data on the supplementary uplink, in case that the indicator indicates that the scheduling of the uplink transmission is associated with the supplementary uplink in the cell,
   wherein the indicator is set to 1, in case that the scheduling of the uplink transmission is associated with the supplementary uplink, and
   wherein the indicator is set to 0, in case that the scheduling of the uplink transmission is associated with the non-supplementary uplink.

2. The method of claim 1, wherein a size of the indicator is one bit.

3. The method of claim 1, further comprising:
   transmitting, to the base station, the uplink data on the non-supplementary uplink in the cell, in case that the indicator indicates that the scheduling of the uplink transmission is associated with the non-supplementary uplink in the cell.

4. The method of claim 1, wherein the indicator is different from a carrier indicator field (CIF).

5. The method of claim 1, further comprising:
identifying whether the indicator indicates that the scheduling of the uplink transmission is associated with the non-supplementary uplink or the supplementary uplink in the cell,
wherein a size of the indicator is zero bit in case that the supplementary uplink is not configured in the cell.

6. A method performed by a base station in a wireless communication system, the method comprising:
transmitting, to a terminal, random access channel (RACH) configuration information for a supplementary uplink in system information;
receiving, from the terminal, a random access (RA) preamble on the supplementary uplink;
identifying whether to schedule uplink transmission for the terminal on a non-supplementary uplink or the supplementary uplink in a cell;
transmitting, to the terminal, downlink control information for the scheduling of the uplink transmission in the cell, wherein the downlink control information includes an indicator indicating the non-supplementary uplink in the cell or the supplementary uplink in the cell; and
receiving, from the terminal, uplink data on the supplementary uplink, in case that the indicator indicates that the scheduling of the uplink transmission is associated with the supplementary uplink in the cell,
wherein the indicator is set to 1, in case that the scheduling of the uplink transmission is associated with the supplementary uplink, and
wherein the indicator is set to 0, in case that the scheduling of the uplink transmission is associated with the non-supplementary uplink.

7. The method of claim 6, wherein a size of the indicator is one bit.

8. The method of claim 6, further comprising:
receiving, from the terminal, the uplink data on the non-supplementary uplink in the cell, in case that the indicator indicates that the scheduling of the uplink transmission is associated with the non-supplementary uplink in the cell.

9. The method of claim 6, wherein the indicator is different from a carrier indicator field (CIF).

10. The method of claim 6,
wherein a size of the indicator is zero bit, in case that the supplementary uplink is not configured in the cell.

11. A terminal in a wireless communication system, the terminal comprising:
a transceiver configured to:
a controller configured to:
receive, from a base station via the transceiver, random access channel (RACH) configuration information for a supplementary uplink in system information,
determine whether to perform a random access (RA) procedure on the supplementary uplink based on the RACH configuration information,
transmit, to the base station via the transceiver, an RA preamble on the supplementary uplink in case that the RA procedure is determined to be performed on the supplementary uplink,
receive, from the base station via the transceiver, downlink control information for scheduling of uplink transmission in a cell, wherein the downlink control information includes an indicator indicating a non-supplementary uplink in the cell or the supplementary uplink in the cell, and
transmit, to the base station via the transceiver, the uplink transmission on the supplementary uplink, in case that the indicator indicates that the scheduling of the uplink transmission is associated with the supplementary uplink in the cell,
wherein the indicator is set to 1, in case that the scheduling of the uplink transmission is associated with the supplementary uplink, and
wherein the indicator is set to 0, in case that the scheduling of the uplink transmission is associated with the non-supplementary uplink.

12. The terminal of claim 11, wherein a size of the indicator is one bit.

13. The terminal of claim 11, wherein the controller is further configured to transmit, to the base station via the transceiver, the uplink transmission on the non-supplementary uplink in the cell, in case that the indicator indicates that the scheduling of the uplink transmission is associated with the non-supplementary uplink in the cell.

14. The terminal of claim 11, wherein the indicator is different from a carrier indicator field (CIF).

15. The terminal of claim 11,
wherein the controller is further configured to identify whether the indicator indicates that the scheduling of the uplink transmission is associated with the non-supplementary uplink or the supplementary uplink in the cell, and
wherein a size of the indicator is set to zero bit in case that the supplementary uplink is not configured in the cell.

16. A base station in a wireless communication system, the base station comprising:
a transceiver; and
a controller configured to:
transmit, to a terminal via the transceiver, random access channel (RACH) configuration information for a supplementary uplink in system information,
receive, from the terminal via the transceiver, a random access (RA) preamble on the supplementary uplink,
identify whether to schedule uplink transmission for the terminal on a non-supplementary uplink or the supplementary uplink in a cell,
transmit, to the terminal via the transceiver, downlink control information for the scheduling of the uplink transmission in the cell, wherein the downlink control information includes an indicator indicating the non-supplementary uplink in the cell or the supplementary uplink in the cell, and
receive, from the terminal via the transceiver, uplink data on the supplementary uplink, in case that the scheduling of the uplink transmission is associated with the supplementary uplink in the cell,
wherein the indicator is set to 1, in case that the scheduling of the uplink transmission is associated with the supplementary uplink, and
wherein the indicator is set to 0, in case that the scheduling of the uplink transmission is associated with the non-supplementary uplink.

17. The base station of claim 16, wherein a size of the indicator is one bit.

18. The base station of claim 16, wherein the controller is further configured to receive, from the terminal via the transceiver, the uplink data on the non-supplementary uplink in the cell, in case that the indicator indicates that the scheduling of the uplink transmission is associated with the non-supplementary uplink in the cell.

19. The base station of claim 16, wherein the indicator is different from a carrier indicator field (CIF).

20. The base station of claim 19, wherein a size of the indicator is zero bit, in case that the supplementary uplink is not configured in the cell.

\* \* \* \* \*